US009539500B2

(12) United States Patent
Leyvand et al.

(10) Patent No.: US 9,539,500 B2
(45) Date of Patent: *Jan. 10, 2017

(54) BIOMETRIC RECOGNITION

(71) Applicant: Microsoft Technology Licensing, LLC, Redmond, WA (US)

(72) Inventors: Tommer Leyvand, Seattle, WA (US); Jinyu Li, Sammamish, WA (US); Casey Meekhof, Kirkland, WA (US); Tim Keosababian, Woodinville, WA (US); Simon Stachniak, Kirkland, WA (US); Ryan Gunn, Maitland, FL (US); Alan Stuart, Duvall, WA (US); Russ Glaser, Woodinville, WA (US); Eddie Mays, Renton, WA (US); Toan Huynh, Redmond, WA (US); Richard Irving, Kirkland, WA (US); James Waletzky, Snoqualmie, WA (US); Ajay Ramjee, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/452,425

(22) Filed: Aug. 5, 2014

(65) Prior Publication Data
US 2014/0349747 A1  Nov. 27, 2014

Related U.S. Application Data

(63) Continuation of application No. 13/080,569, filed on Apr. 5, 2011, now Pat. No. 8,824,749.

(51) Int. Cl.
*A63F 13/10* (2006.01)
*A63F 13/40* (2014.01)
(Continued)

(52) U.S. Cl.
CPC .............. *A63F 13/10* (2013.01); *G06F 21/32* (2013.01); *G06K 9/00221* (2013.01)

(58) Field of Classification Search
CPC . A63F 13/10; G06K 9/00221; G06K 9/00006; G06K 9/00013; G06K 9/00248; G06K 9/00275; G06K 9/00281; G06K 9/00302; G06K 9/00335; G06F 21/32; G06F 17/30032; A61B 5/11
See application file for complete search history.

(56) References Cited

U.S. PATENT DOCUMENTS 4,627,620 A  12/1986  Yang
4,630,910 A  12/1986  Ross et al.
(Continued)

FOREIGN PATENT DOCUMENTS

CN  201254344 B  6/2010
EP  0583061 A2  2/1994
(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

(Continued)

*Primary Examiner* — David L Lewis
*Assistant Examiner* — Matthew D. Hoel
(74) *Attorney, Agent, or Firm* — Gregg Wisdom; Judy Yee; Micky Minhas

(57) ABSTRACT

A method for biometric identification for use with a computing device is provided herein. The method includes capturing a temporal sequence of images of the face of a user at different locations within a three-dimensional interaction (Continued)

space. The method further includes extracting one or more face descriptors from the images and generating a biometric template compiling the face descriptors.

20 Claims, 10 Drawing Sheets

(51) Int. Cl.
  *G06K 9/00* (2006.01)
  *G06F 21/32* (2013.01)

(56) References Cited

U.S. PATENT DOCUMENTS

| | | | |
|---|---|---|---|
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,623,428 A | 4/1997 | Kunii et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,142,876 A * | 11/2000 | Cumbers | G06K 9/00597 235/380 |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,350,696 B2 | 4/2008 | Frerking | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |

(56) References Cited

U.S. PATENT DOCUMENTS

| | | | |
|---|---|---|---|
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2004/0042643 A1 | 3/2004 | Yeh | |
| 2006/0035707 A1* | 2/2006 | Nguyen | G07F 17/32 463/29 |
| 2008/0005578 A1 | 1/2008 | Shafir | |
| 2008/0026838 A1 | 1/2008 | Dunstan et al. | |
| 2008/0162943 A1 | 7/2008 | Ali et al. | |
| 2010/0030578 A1 | 2/2010 | Siddique et al. | |
| 2010/0257601 A1 | 10/2010 | Bolyukh et al. | |
| 2011/0190055 A1 | 8/2011 | Leyvand et al. | |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Delac et al., "A Survey of Biometric Recognition Methods", In the proceedings of 46th International Symposium Electronics in Marine, ELMAR-2004, Jun. 16, 2004, pp. 184-193.

Silverstein et al., "Microsoft 'Kinect,' Controller-Free Gaming System, Senses Players' Motions", ABCNews.com, Retrieved at http://abcnews.go.com/Technology/Media/microsoft-unveils-controller-free-gaming-world/story?id=10907707, Jun. 14, 2010, 2 pages.

Shan et al., "Illumination Normalization for Robust Face Recognition against Varying Lighting Conditions", In the proceedings of the IEEE International Workshop on Analysis and Modeling of Faces and Gestures, Oct. 17, 2003, 8 pages.

"Visual Based Identity Tracking", U.S. Appl. No. 12/696,282, Jan. 29, 2010, 49 pages.

* cited by examiner

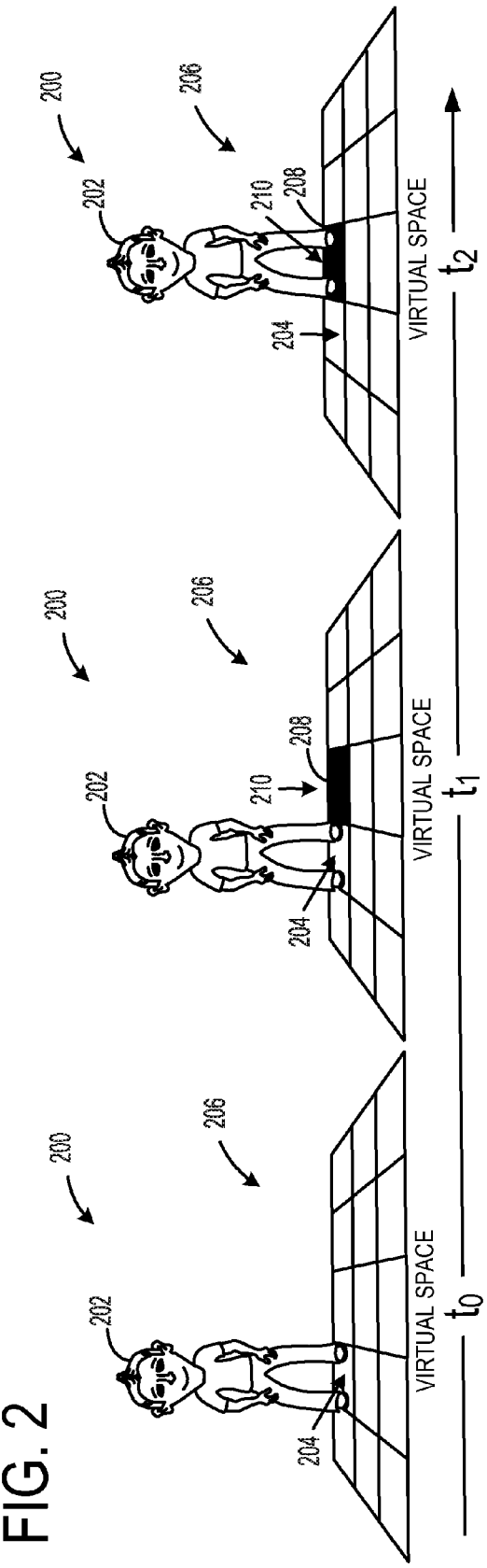
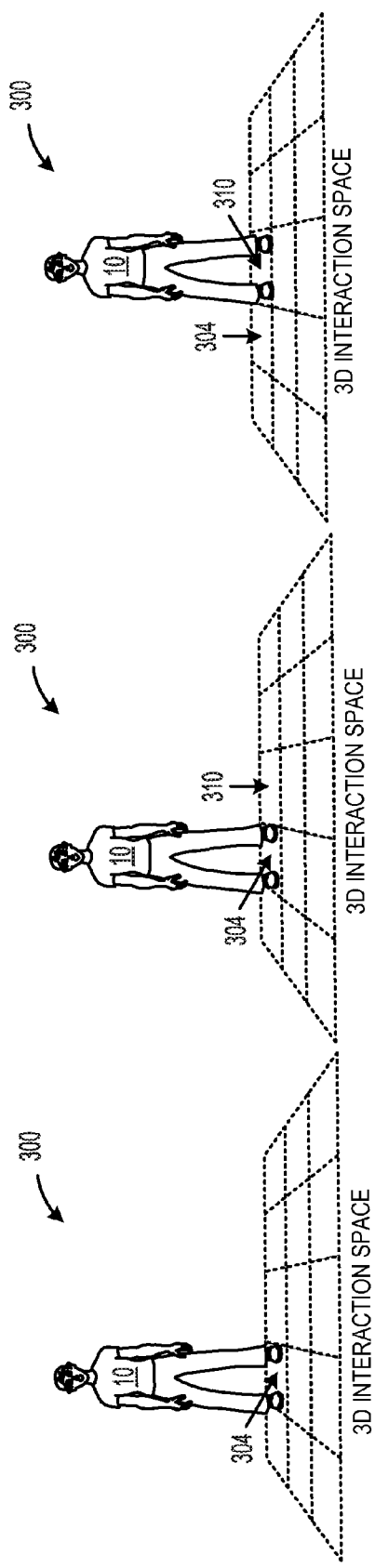

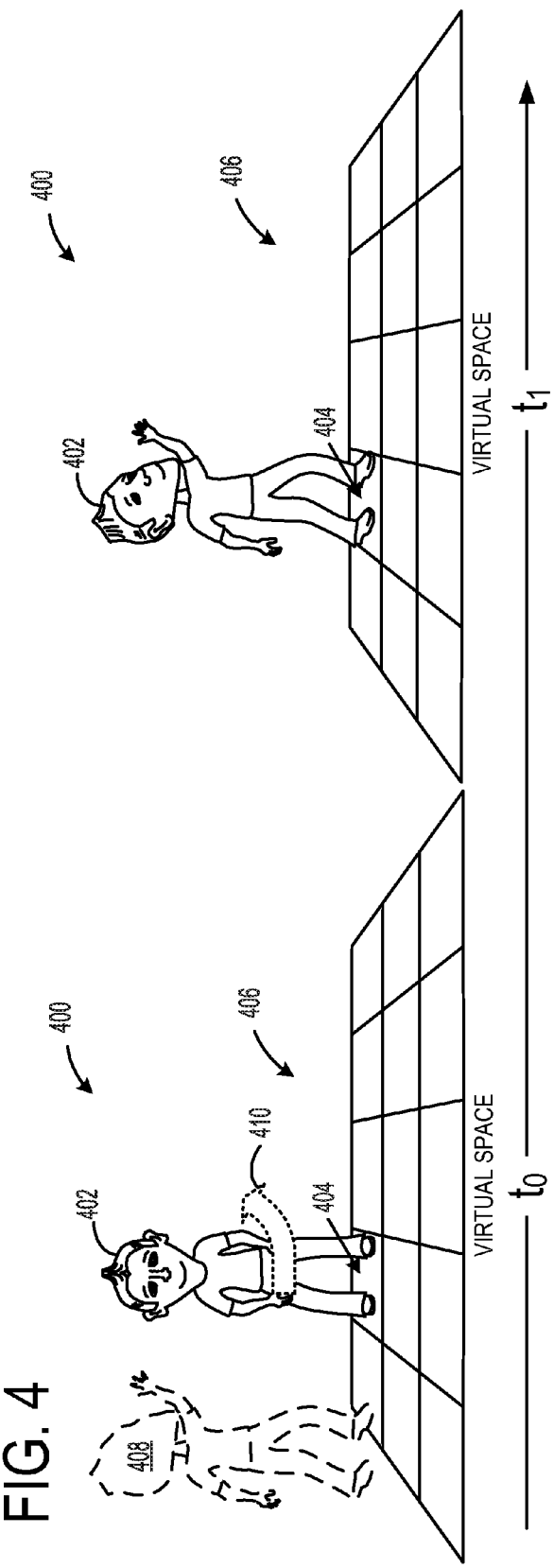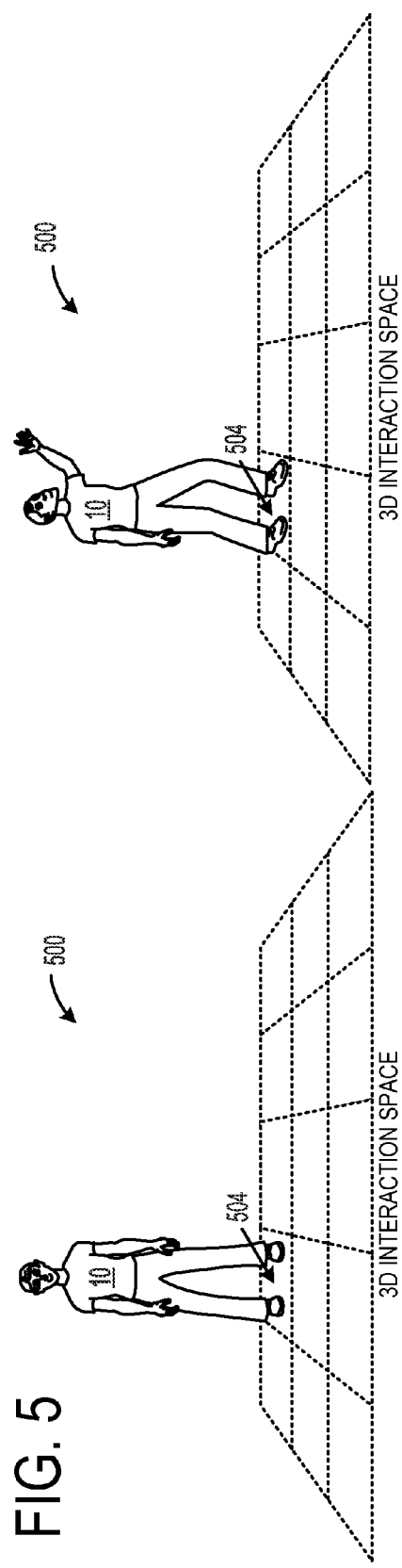

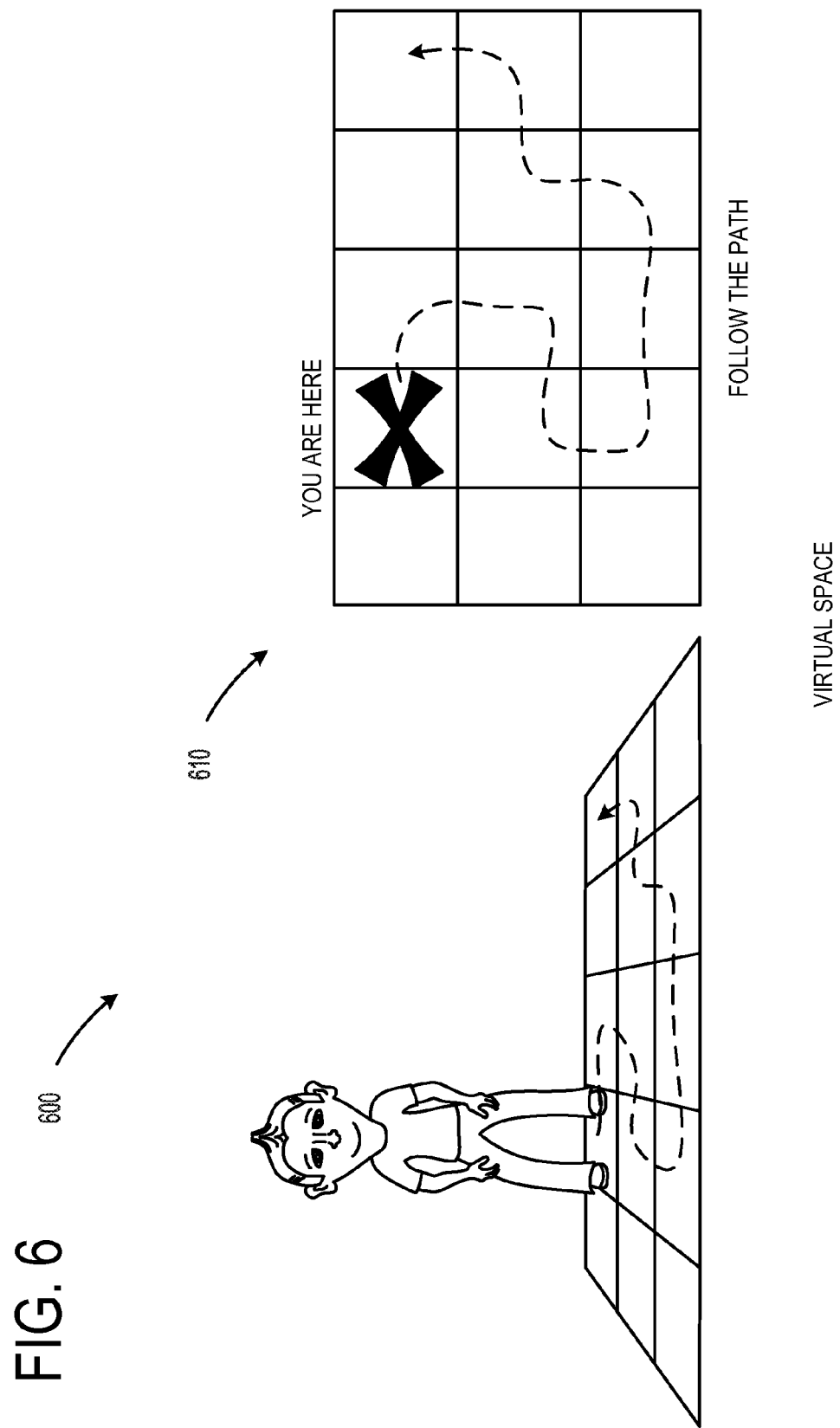

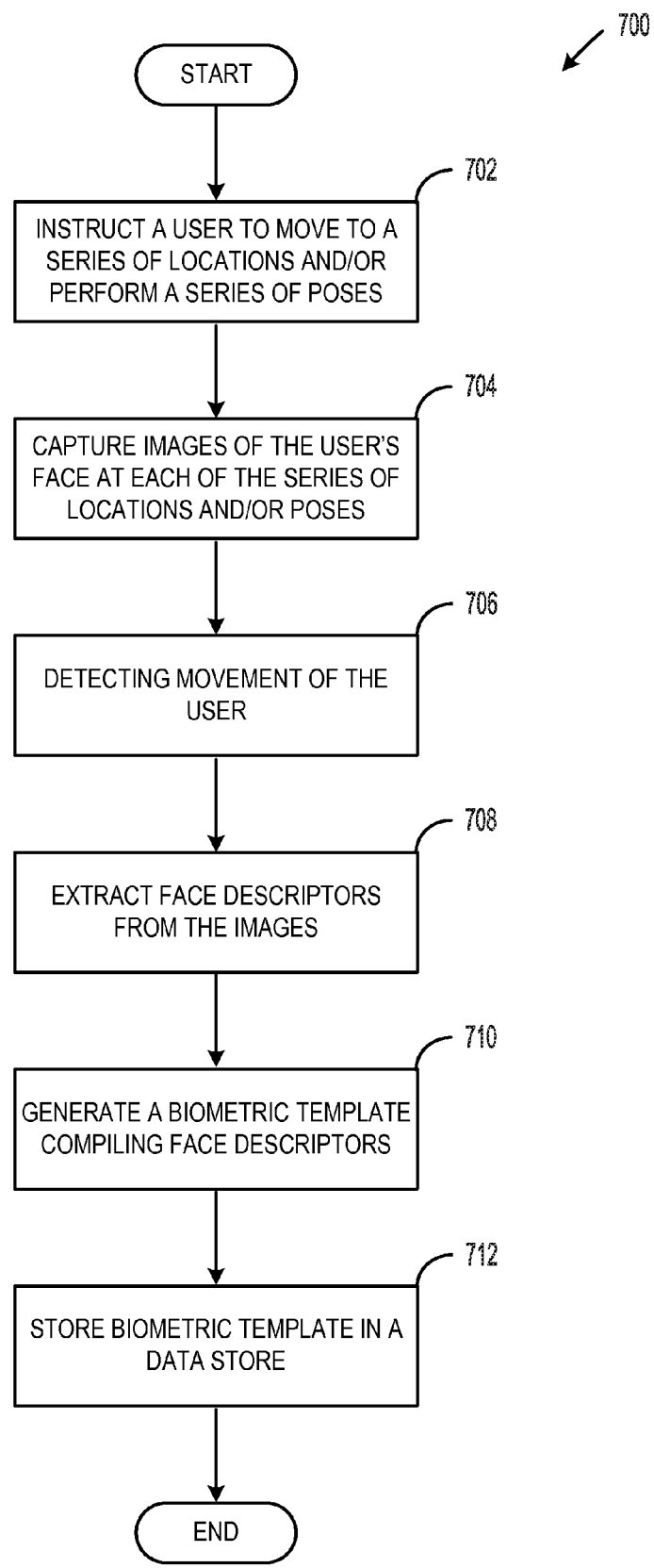

BIOMETRIC RECOGNITION

CROSS REFERENCE TO RELATED APPLICATIONS

This application is a continuation of U.S. patent application Ser. No. 13/080,569, filed on Apr. 5, 2011, and titled "BIOMETRIC RECOGNITION" the entire disclosure of which is hereby incorporated herein by reference.

BACKGROUND

Computer gaming systems have evolved to increase user interaction and provide a more active gaming experience. As such, gaming has become a more social activity bringing multiple players together. The excitement that several players may exude while playing a game may entice more to join in on the fun. One prior approach to allowing new players to join a game involves pausing or restarting the game in order to add another game player. The new player typically signs in by typing a player name and password into the computer gaming system, for example, using an onscreen keyboard manipulated by a game controller. However, pausing or restarting and typing in such information interrupts the flow of the game, which is undesirable to those players that are already involved in the game play. Further, in computer gaming systems that utilize natural user input via body movements, the players may not handle controllers to operate such onscreen keyboards, which might make onscreen input time consuming or difficult.

The general idea of using biometric identification for access to a gaming system has been proposed; however, in practice many challenges exist to the adoption of such techniques. For example, one serious drawback of current face recognition techniques is that they are sensitive to ambient lighting conditions, resulting in high error rates in variable and unpredictable lighting conditions. This frustrates the adoption of such biometric identification techniques for gaming systems that are used in home environments, for example, due to the highly variable lighting conditions found inside such environments.

SUMMARY

A method for biometric identification for use with a computing device is provided herein. The method includes capturing a temporal sequence of images of the face of a user at different locations within a three-dimensional interaction space. The method further includes extracting one or more face descriptors from the images and generating a biometric template compiling the face descriptors.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a time lapse view of three successive screen images from a graphical user interface displayed on a display of the gaming system of FIG. 1, showing an example onscreen virtual interaction space ("virtual space") for instructing a user to move within the 3D interaction space of FIG. 1.

FIG. 3 is a perspective view showing a user moving within 3D interaction space of FIG. 1, according to the instructions given in the virtual space of FIG. 2.

FIG. 4 is another time lapse view of three successive screen images from the graphical user interface displayed on the display of the gaming system of FIG. 1, showing another example virtual space for instructing a user to move within the 3D interaction space of FIG. 1.

FIG. 5 is a perspective view showing a user moving within 3D interaction space of FIG. 1, according to the instructions given in the virtual space of FIG. 4.

FIG. 6 is another example virtual space displayed on the display of the gaming system of FIG. 1, for instructing a user to move within the 3D interaction space of FIG. 1.

FIG. 7 is a flowchart that illustrates an example embodiment of a method for registering a user with a biometric identification account.

DETAILED DESCRIPTION

Aspects of this disclosure will now be described by example and with reference to the illustrated embodiments listed above.

Figure 1:
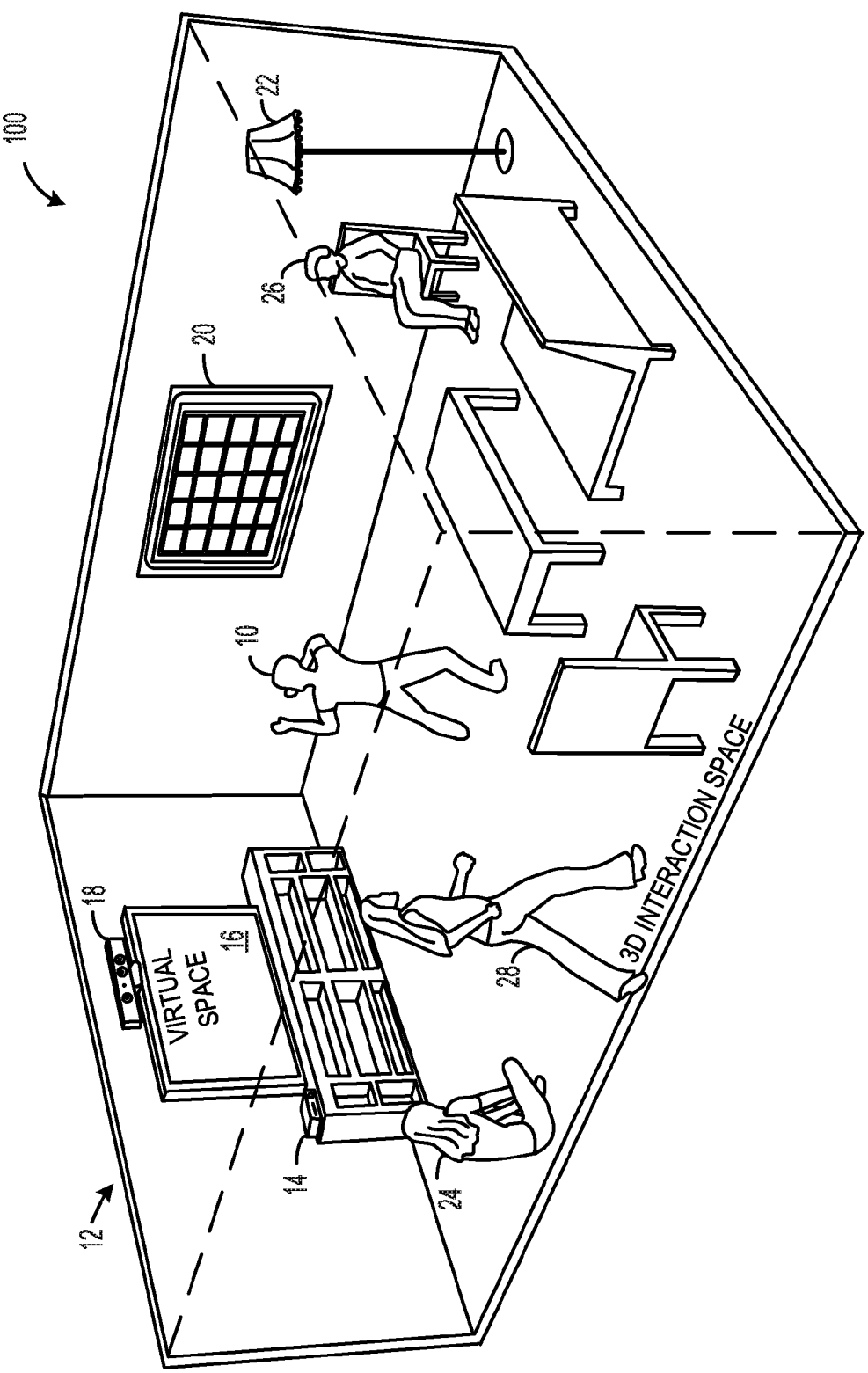
FIG. 1 is a perspective view showing an example three-dimensional real-world user interaction space ("3D interaction space") of a gaming system according to one embodiment.

FIG. 1 shows an example three-dimensional (3D) interactive space 100 in which user 10 is located. FIG. 1 also shows gaming system 12 which may enable user 10 to interact with a video game. Gaming system 12 may be used to play a variety of different games, play one or more different media types, and/or control or manipulate non-game applications and/or operating systems. Gaming system 12 may include gaming console 14 and display device 16, which may be used to present game visuals to game players. Gaming system 12 is a type of computing device, the details of which will be discussed with respect to FIG. 11.

Turning back to FIG. 1, 3D interaction space 100 may also include a camera such as capture device 18, which may be coupled to gaming system 12. Capture device 18 may be used to observe 3D interaction space 100 by capturing images. As such, capture device 18 may be used to identify user 10 by detecting one or more particular biometric features of user 10. For example, capture device 18 may capture images of the user's face to identify one or more particular face descriptors. In this way, user 10 may be recognized by the gaming system, and as such, may be associated with a corresponding user account.

Traditional facial recognition technology is insufficient in tolerating microchanges in a user's face. For example, facial features may fluctuate slightly in different light, and further, facial features may change over time. For example, a user's appearance may change over time due to a different hairstyle, presence/absence of facial hair, presence/absence of glasses, and/or generally as the user ages. In such cases, a user may not be properly identified and may be prompted to repeatedly pose for a face scan, which may lead to user frustration.

The present disclosure overcomes at least some of these challenges by tolerating microchanges in a user's face. For example, as described in detail below, a user may register a biometric identification account which may include capturing the user's face in different locations and different orientations. In this way, a user's face may be analyzed in different lighting conditions, and by capturing different angles of the user's face from the perspective of the camera.

Figure 12:
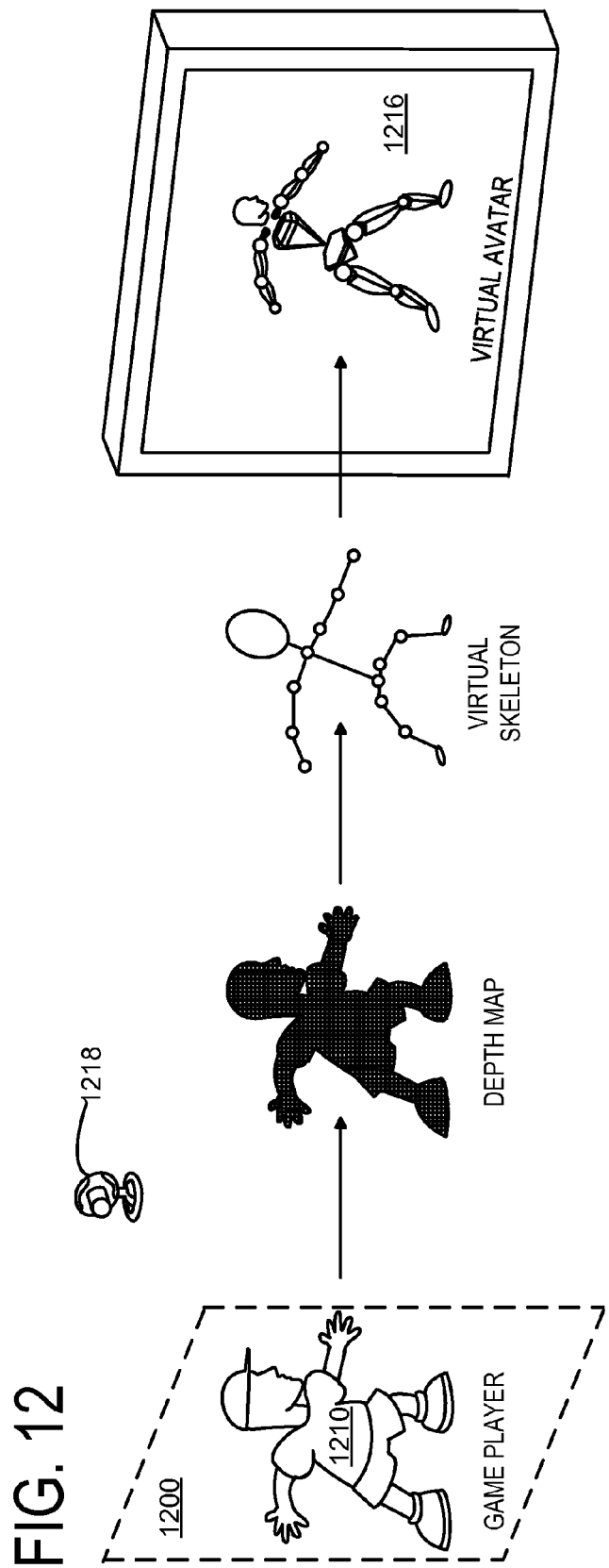
FIG. 12 schematically shows a human target in an observed scene being modeled with example skeletal data by the gaming system of FIG. 1.

For example, as shown in FIG. 1, window 20 and/or lamp 22 may affect the way in which the face of user 10 is perceived by capture device 18. Further, the capture device may perceive the face of the user differently according to varying facial expressions, such as smiling, laughing, frowning etc. The user blinking may also affect the way in which the face of user is perceived by the capture device. Therefore, capture device 18 may be configured to capture a plurality of images of the face of the user at a series of different locations and/or in a series of different orientations. To achieve this, gaming system 12 may be configured to instruct the user to move to a series of locations and/or match a series of poses within 3D interaction space 100. Examples of instructing a user are discussed in greater detail with respect to FIGS. 2-5. Further, an example method for registering a user biometric identification account is provided in FIG. 7. In addition, a pipeline for recognizing a human target, creating a depth map, creating a virtual skeleton, and then displaying a virtual avatar, is illustrated in FIG. 12. It will be appreciated that the virtual skeleton created in this manner may be used to identify the poses discussed below, and the location and orientation of a body and face of the user.

For a first example, FIG. 2 schematically shows an example virtual space 200 at different moments in time (e.g., time $t_0$, time $t_1$, and time $t_2$) that corresponds to FIG. 3, which schematically shows a 3D interaction space 300. Virtual space 200 may be displayed to user 10 on a display device, and may be used to instruct user 10 within 3D interaction space 300, to move to a different location. As such, a camera may capture one or more images of the user's face at the different location and/or while the user is transitioning to the different location. Capturing such images may be used to detect one or more face descriptors in different lighting conditions, for example.

Referring to FIGS. 2 and 3, at time $t_0$, a user character FIG. 202 is shown at virtual location 204 on 3D map 206, which correlates to user 10 at physical location 304. 3D map 206 is shown as a 3×5 grid by way of example and is not meant to be limiting. User character FIG. 202 provides feedback to user 10, wherein the virtual location of user character FIG. 202 matches the physical location of user 10. The virtual location of user character FIG. 202 may match the physical location of user 10 in a one-to-one relationship. As such, the user character figure changes virtual locations in response to the user moving within the physical environment in real-time.

At time $t_1$, a visual cue 208 is displayed at a target virtual location 210. In this way, visual cue 208 is provided to prompt user 10 to move to a different location within 3D interaction space 300.

At time $t_2$, user 10 moves to physical location 310 corresponding to target virtual location 210. Because user 10 has changed locations by moving from physical location 304 to physical location 310, user character FIG. 202 is shown at target virtual location 210. In this way, visual cue 208 instructs user 10 to move to a particular physical location and user character FIG. 202 tracks the movement of user 10 to provide real-time feedback.

Visual cue 208 is shown as an illuminated tile on 3D map 206 but it will be appreciated that other cues are possible without departing from the scope of this disclosure. For example, the visual cue may be an arrow directing the user to a new location. As another example, the cue may be audio such that the user receives verbal instructions, and/or text may be displayed on the display directing the user to move. Virtually any cue is possible and the above are provided as non-limiting examples.

It will be further appreciated that a user may be advised to move within the 3D interaction space without receiving a cue. For example, the user may be advised to move about the 3D interaction space without being prompted to move to a particular physical location. In other words, the user may be asked to move around and the computing system may track the movement of the user. In this way, the user character figure may track the movement of the user as the user freely moves within the 3D interaction space. Further, the display may include a virtual path that displays to the user where they have moved.

As another example for instructing a user, FIG. 4 schematically shows an example virtual space 400 at different moments in time (e.g., time $t_0$, time $t_1$) that corresponds to FIG. 5, which schematically shows a 3D interaction space 500. Virtual space 400 may be displayed to user 10 on a display device, and may be used to instruct user 10 within 3D interaction space 500 to match a pose. In this way, user 10 may be instructed to change to a different orientation so that a camera may capture one or more images of the user's face at the different orientation and/or while the user is transitioning to the different orientation. Capturing such images may be desirable for detecting one or more face descriptors in different lighting conditions, for example.

Referring to FIGS. 4 and 5, at time $t_0$, a user character FIG. 402 is shown at virtual location 404 of 3D map 406, which correlates to user 10 at physical location 504. As described above, user character FIG. 402 provides real-time feedback to user 10. As shown, a pose instructor FIG. 408 and a pose movement icon 410 may be included in virtual space 400 to instruct user 10 to perform the requested pose.

At time $t_1$, user 10 strikes the requested pose displayed by pose instructor FIG. 408. Because user 10 has changed orientations, user character FIG. 402 is shown in a corresponding orientation.

It will be appreciated that a user may be instructed to match a pose with the pose instructor figure or the pose movement icon, and as such, displaying both may not be prudent. Further, one or more pose movement icons may be used to prompt the user to adjust their pose when the detected pose does not match the pose instructor figure within a threshold matching score, for example. As such, the virtual space may include an indication to notify the user that the correct pose has been performed. Likewise, the user may receive additional instructions and/or indications to adjust the user location as well as the user orientation to within a matching threshold.

As shown in FIGS. 2 and 4, 3D maps 206 and 406 may be a 3×5 grid of tiles, however it will be appreciated that other configurations are possible. Likewise, FIGS. 3 and 5 show a corresponding 3×5 grid with dashed lines. This illustration is for simplicity of understanding, not technical accuracy. It will be appreciated that 3D interaction spaces 300 and 500 may not include a grid that is visible to the user, as they are typically in the home of the user. Although in some embodiments, the gaming system may optionally include a projection device to project a grid within 3D interaction space to further orient and instruct user 10.

It will be appreciated that while the illustrations in FIGS. 2-5 show examples of instructing a user to move to one location and perform one pose, that the user may be instructed to move to a series of locations and/or to perform a series of poses. As described above, the series of locations and/or series of poses enable the capture device to capture images of the user's face in a variety of different positions and/or different orientations.

For example, a virtual space may include a virtual path to instruct a user within 3D interaction space to follow the virtual path. As such, a visual cue may include an indication to the user to follow the virtual path which may be displayed within the virtual space. The virtual path may include a series of successive virtual locations and/or a series of poses for the user to follow and/or match within the 3D interaction space. Further, the virtual space may additionally or alternatively include an aerial view of the virtual space to orient the user along a virtual path, which is provided as a non-limiting example of a visual cue. FIG. 6 shows an example virtual space 600 including an example visual cue 610 that may be used to instruct a user to follow a virtual path. It will be appreciated that visual cue 610 is provided by way of example and may include additional or alternative features than those shown in FIG. 6 without departing from the scope of this disclosure. By capturing images of a user in a series of locations and/or in a series of orientations, a user may create a biometric template, thus registering the user with a biometric identification account.

FIG. 7 illustrates an example method 700 for registering a user biometric identification account for use with a computing device. At 702, the method comprises, instructing a user to move to a series of locations and/or perform a series of poses within a 3D interaction space, wherein the 3D interaction space is monitored by a camera associated with the computing device.

As introduced above, instructing may include displaying, on a display device, a 3D map within the virtual space. For example, the 3D map may include a series of virtual locations that correspond to a series of locations in the 3D interaction space. Further, the 3D map may include a visual cue at a target virtual location to prompt the user to move to a target physical location within the 3D dimensional interaction space corresponding to the target virtual location. Additionally, the virtual space may include a pose movement icon, such as an arrow, proximate to the user character figure. Additionally or alternatively, the virtual space may include a pose instructor figure performing a requested pose. In this way, the user may be prompted to move and/or strike a pose.

At 704, method 700 includes capturing, via the camera, a temporal sequence of images of the face of the user at each of the series of locations. The temporal sequence of images may also be captured while the user is performing the requested pose. Further, method 700 may include capturing a temporal sequence of images of the face of the user while the user is transitioning between each location and/or pose. The images may be captured in color, black and white, or grayscale.

At 706, method 700 includes detecting movement of the user to the target physical location within the 3D interaction space by analyzing the captured images. In this way, the camera may continuously monitor the user within the 3D interaction space.

Further, method 700 may include displaying a user character figure in the virtual space to match the detected movement of the user. The user character figure may be configured such that the movement of the user character figure matches the movement of the user in real-time. In this way, the user character figure is animated to match a position of the user within the 3D interaction space at a one-to-one relationship. For example, when the user is positioned at the target physical location, the user character figure is positioned at the corresponding target virtual location. As such, the position of the user character figured is based on the detected movement of the user.

Detecting movement of the user may include generating a skeletal model of the user based on the captured temporal sequence of images, for example, in the manner described below in relation to FIG. 12. The skeletal model may track the movements of the user within the 3D interaction space. As such, the user character figure may be mapped to the skeletal model, thus tracking the movements of the user. Therefore, skeletal modeling may include adjusting the configuration and/or position of the skeletal model to match the detected movement of the user. Further, a location of the face of the user in each of the images may be determined by making reference to the skeletal model.

The skeletal model may be utilized to determine if the user has relocated to the correct target position and/or has matched the requested pose to within a matching threshold. If the user position does not match the target position and/or requested pose, the method may further include presenting feedback to the user. For example, if the user does not perform the requested pose to within the matching threshold, the user may be presented with pose feedback requesting that the user adjust the pose in a determined manner. The pose movement icon and/or the pose instructor figure may prompt the user to repeat the pose until the user matches the requested pose to within the matching threshold.

At 708, method 700 includes extracting one or more face descriptors from each of the images. For example, face descriptors may be determined by assessing groups of pixels that belong to common epidermal hues. Different groups of pixels may be identified so as to create a characteristic map of the user's face. It will be appreciated that face descriptors are biometric measurements of features on a user's face that may be utilized, in the aggregate, to identify a user. An example face descriptor is a distance between the center of the eyes.

By extracting face descriptors from each image of the series of locations and/or poses, variations in a user's face may be determined. For example, a user moving towards a window may result in more light being cast on the user's face, whereas a user moving away from a window may result in less light being cast on the user's face. Likewise, the position of a user face in relation to a lamp may also contribute to variations in face descriptors. Put in another way, the location of an object and/or another user within the 3D interaction space may cast a shadow on the face of the user thereby contributing to variations in face descriptors. In addition, the distance of the user from the camera may impart variations in detected face descriptors, although this distance can in some instances be measured by a depth camera and accounted for by programmatic logic.

At 710, method 700 includes generating a biometric template compiling the one or more face descriptors. The biometric template may be constructed in any suitable way. For example, each descriptor may be represented by a dot, wherein a cluster of dots may be representative of all the face descriptors extracted at a particular user face position. In this way, the biometric template may contain more than one cluster of dots corresponding to more than one user face position. As another example, the face descriptors may be compiled such that they are represented by a single geometric shape that defines the user's face at a particular user face position. In this way, the biometric template may contain more than one geometric shape corresponding to more than one user face position. Referring to the previous example, the compiled face descriptors may be a mosaic including different irregular patches corresponding to the different epidermal hues. As another example, the compiled face descriptors may be organized in such a way so as to represent different facial features, and/or facial shapes.

Generating a biometric template may further include augmenting and/or filtering the face descriptor data to thereby create a consolidated biometric template of the user. In this way, biometric data extracted from the images taken from each of the series of locations and/or each of the series of orientations may be parsed to remove extraneous data. For example, the computing system may extract enough face descriptors to exceed an augmenting threshold and/or a filtering threshold. In such cases, the computing system may be prompted to augment and/or filter the biometric data. Augmenting and filtering will be discussed in greater detail below with reference to FIG. 8.

At 712, method 700 includes storing the biometric template associated with the user in a data store. For example, the biometric template may be stored locally on a local computing device that belongs to the user and/or remotely at a remote storage location of a gaming service accessible via a computer network such as the Internet, so that the user may access their account from another computing device.

Method 700 may be implemented by a computing device when a user is first accessing the computing device, a feature of the computing device and/or a program of the computing device. In other words, when the user is initiating a registration phase.

It will be appreciated that method 700 may include additional or alternative steps without departing from the scope of this disclosure. For example, method 700 may include requesting consent from the user to extract biometric features in order to establish a stored biometric template and associate the stored biometric template with a user account. Method 700 is provided by way of example to establish a user account that may be used to biometrically identify the user during an identification phase. For example, when the computing device is a gaming device, method 700 may be used to establish a user gaming account.

Once a user account has been established, the user may be recognized and logged into a subsequent gaming session automatically. For example, when a gaming session is initiated, gaming system 12 may be prompted to search the 3D interaction space for one or more potential game players. As such, gaming system 12 may be configured to automatically add a game player to a game session when the game player is identified by matching their particular face descriptors to a stored biometric template associated with the game player.

Figure 8:
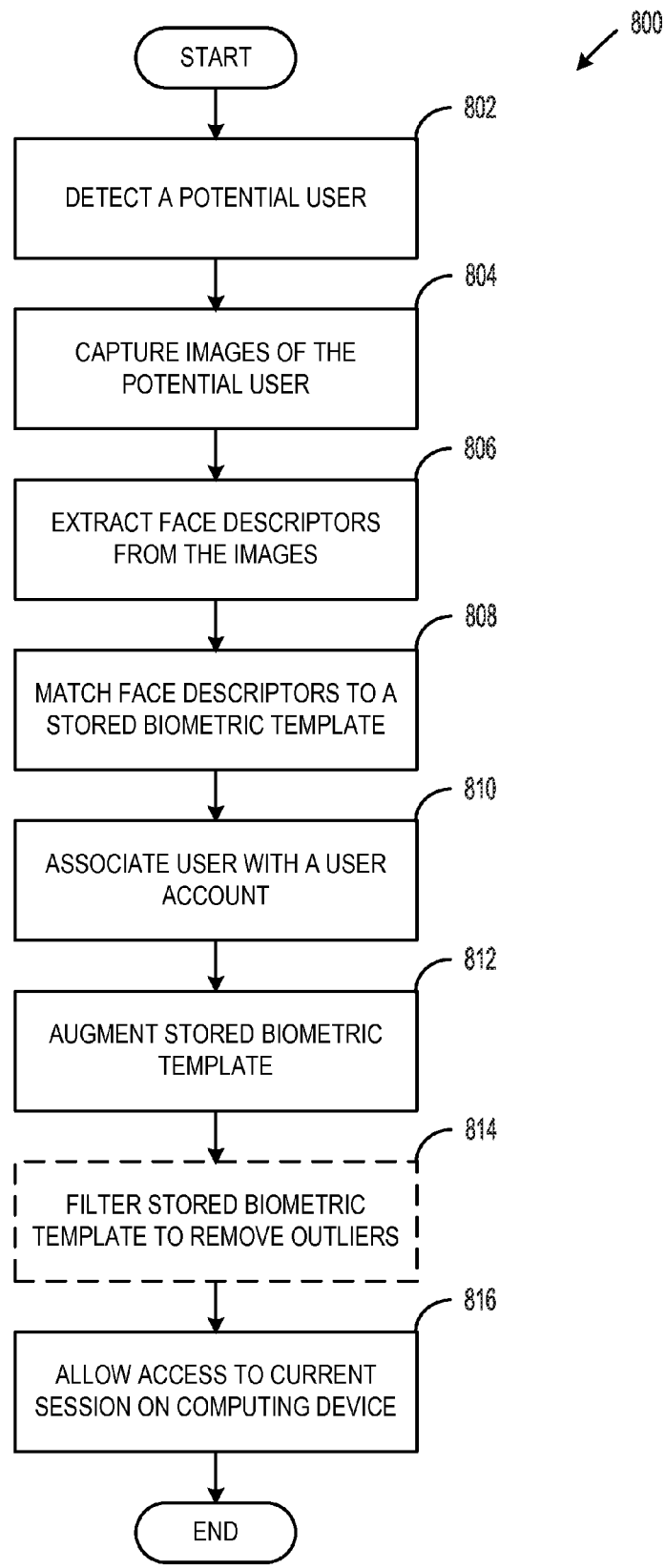
FIG. 8 is a flowchart that illustrates an example embodiment of a method for identifying a user with an established biometric identification account.

FIG. 8 illustrates an example method 800 for identifying a user with an established biometric identification account and associating the user with a computing device. Method 800 is provided so as to be used with a computing device during a biometric identification phase. For example, when the computing device is a gaming device, the identification phase may be during game play.

At 802, the method begins with detecting the presence of a potential user. For example, a potential user may be detected if the user is within a field of view of the capture device. Referring back to FIG. 1, user 10 is shown within a field of view of capture device 18, and thus may be identified as a potential user. Since spectator 24 is outside the field of view of capture device 18, spectator 24 may not be recognized as a potential user. Further, the gaming system may be configured such that spectators are ignored based on their orientation. For example, the gaming system may recognize spectators in a sitting position and as such may choose to ignore the spectators even if a spectator is within a field of view of the capture device.

In some embodiments, the computing system may recognize a potential user after receiving input from the user. The input may be captured visually by the capture device, for example, as a user intent to engage with a computing session. For example, the user may perform a gesture, such as waving a hand, which may be detected by the computing system. Such a gesture may be interpreted as a prompt to recognize the user as a potential user. It will be appreciated that a user waving their hand is provided as a non-limiting example, and other gestures and/or other types of user input are possible.

Turning back to FIG. 8, at 804, the method includes capturing one or more images of the face of the user. Unlike the registration phase described above, the identification phase may not instruct the user to assume a particular position or strike a particular pose.

At 806, the method includes extracting face descriptors of the user from the images captured of the user's face. As described above, face descriptors may be extracted from one or more of the capture images and each descriptor may be associated with a group of pixels that have a common epidermal hue, which is provided as one non-limiting example. Further, each face descriptor may be saved as a dot on a data plot, wherein a cluster of dots includes a respective number of face descriptors.

At 808, the method includes identifying the user by matching the extracted face descriptors of the user to a stored biometric template associated with a user account. For example, a match may be determined if the detected face descriptors match the face descriptors of the stored biometric template within a threshold matching score.

At 810, the method includes associating the user with their user account. It will be appreciated that a user may have more than one user account wherein each account may be linked to different programs, games, and/or applications according to the user's account settings. The user may customize their account settings to control access to features on the computing device. Such features may be controlled depending on whether the user has accessed their account from a local computing device or from a remote computing device. An example method for accessing a local account versus a remote account will be discussed greater detail below with respect to FIG. 9.

Turning back to FIG. 8, at 812, the method includes augmenting the stored biometric template of the user with updated face descriptors. For example, the detected face descriptors may be added to the stored biometric template such that the user has more than one stored biometric template. As another example, the detected face descriptors may be merged with the face descriptors of the stored biometric template to thereby maintain a single biometric template with updated data. In this way, the stored biometric template may account for changes in the user's face over time. The stored biometric template may be updated on each login of the user. As another example, the stored biometric template may be updated at predetermined intervals and/or when the detected face descriptors vary from the stored face descriptors by a predetermined threshold.

At 814, method 800 may optionally include filtering the biometric template to remove outlying face descriptors. In this way, the stored biometric template may be updated by generating a consolidated representation of the user over time. Using the cluster example from above, filtering may include removing dots that reside substantially outside of the cluster.

At 816, the method includes allowing the user access to a current session on the computing device. For example, the user may gain access to a program on the computing device. As another example, when the computing device is a gaming device, a game player may be associated with a current gaming session.

It will be appreciated that method 800 may include additional or alternative steps without departing from the scope of this disclosure. Method 800 is provided by way of example to biometrically identify a user with an established a user account. For example, when the computing device is a gaming device, method 800 may be used to associate a game player with a user gaming account.

Continuing with the gaming system as an example, it will be appreciated that a game player may be added to an ongoing game play session at any time. It will also be appreciated that more than one game player may be added to the ongoing game play session using biometric identification. Referring back to FIG. 1, 3D interaction space 100 may include more than one potential user. For example, user 10 may have already been associated with a current gaming session. User 28 may be recognized as a potential user as user 28 walks into 3D interaction space 100 and thus into the field of view of capture device 18. As such, user 28 may be identified with an established biometric identification account and associated with the current gaming session. As another example, user 28 may not be detected as a potential user until user 28 waves at capture device 18, as described above.

It will also be appreciated that a game player may be added to the ongoing game play session even if the game player does not have an established biometric account. Such circumstances are discussed in greater detail below with reference to FIG. 9.

Further, method 800 may occur automatically without displaying any indication on the display that method 800 is being implemented by the gaming device. In this way, a game player may have a magical gaming experience, wherein, when the game player walks into the room during an ongoing gaming session, the game player may be automatically identified and added to the session without interrupting the current gaming session. As such, a game player is seamlessly incorporated into the gaming session, thus enriching the interactive gaming experience.

In some embodiments, the association of the game player with a current gaming session may include an indication that the game player has been added. For example, the indication may be visual, audio, or both. As a non-limiting example, when a game player is represented in a gaming session by an avatar associated with the game player profile, the avatar may be displayed as a visual indication that the game player has been added. In this way, the avatar is seamlessly incorporated into the gaming session.

It will be appreciated that a user account may include information in addition to the user's stored biometric template. For example, a user may create a profile that may catalogue the user's likes and dislikes. Such information may be incorporated into a program on the computing device when the user is recognized. For example, a family of four may be within a field of view of a camera associated with the computing device. Each family member may be recognized by the computing system, through biometric identification. The computing system may then sift through the profiles of each family member to suggest a list of movies stored within a library that is compatible with one or more movie preferences associated with each family member's profile. As another example, the computing system may be configured to provide a list of movie suggestions that accommodates the preferences of all family members interacting with the computing system. In this way, a family of four may quickly select a movie to watch that they may all enjoy.

It will be appreciated that a user may control account preferences that may impart varying levels of security, and as such the computing device may request additional authorization steps, such as detecting the second user authentication mechanism, prior to adding a user to a session. For example, user 10 may desire different levels of security for logging into a session on their local device as opposed to logging into a remote device. For example, gaming system 12 may recognize the face descriptors of user 10 and associate user 10 with their account, but may request a password prior to adding user 10 to the current gaming session. As another example, a user may customize their account settings to request additional authorization steps, such as detecting the second user authentication mechanism, when the user wants to make a purchase using their biometric identification account.

Figure 9:
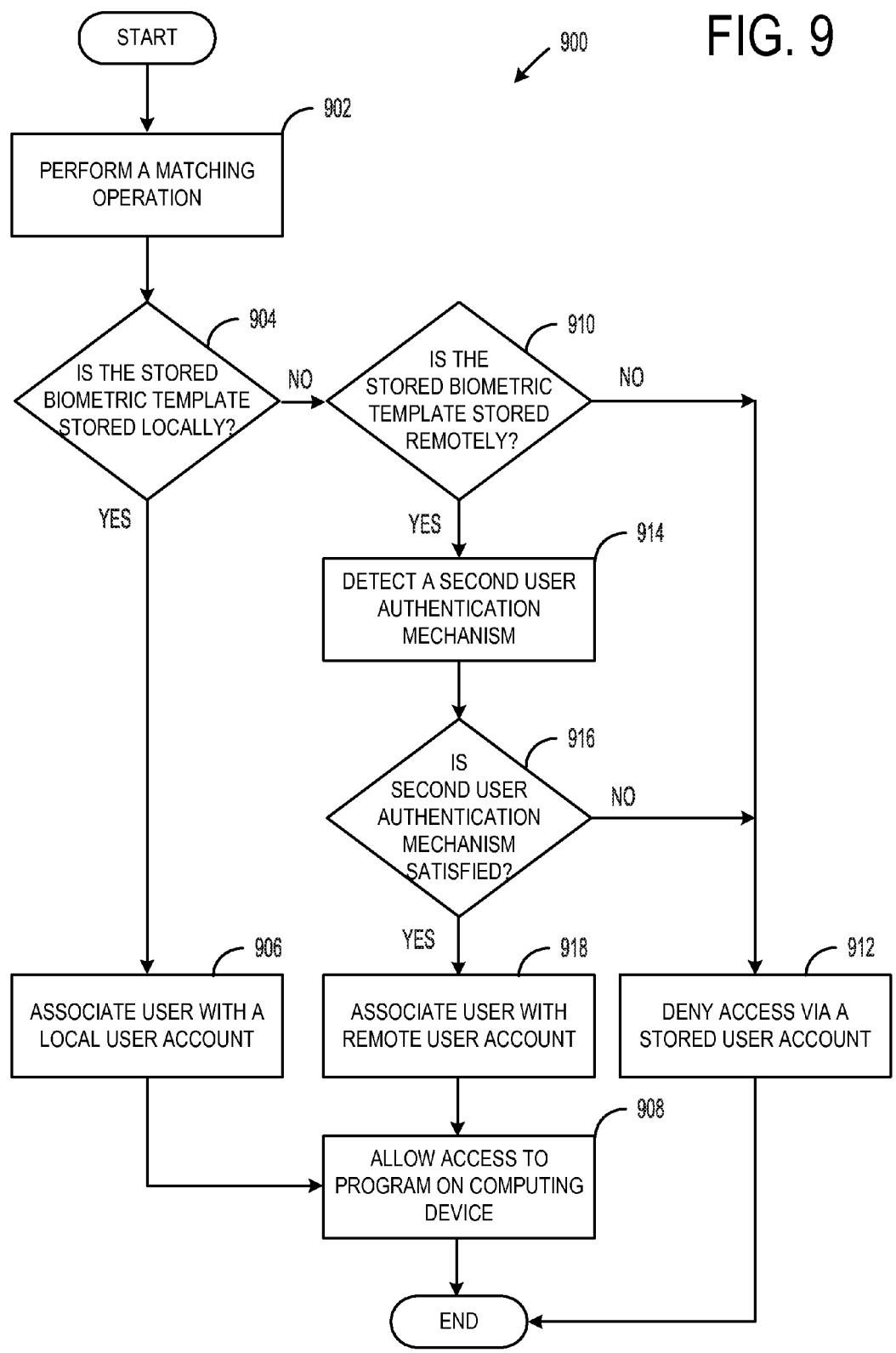
FIG. 9 is a flow chart that illustrates an example embodiment of a method for associating a user with a computing device.

As one example, FIG. 9 illustrates a method 900 for associating a user with a computing device based on a location of a stored biometric template. Method 900 is to be implemented by a computing device and may be used for controlling access to features of the computing device based upon whether a user account is stored on a local computing device or a remote computing device, such as a server.

At 902, the method includes performing a matching operation to match the face descriptors of the user to a stored biometric template. For example, a matching operation may include aligning a cluster of detected face descriptors with a cluster of face descriptors from a stored biometric template. As described above, a match may be determined within a predetermined threshold matching score.

At 904, the method includes determining if the stored biometric template is stored locally. For example, the stored biometric template may be stored on a local device, such as a home computing system. The home computing system may be configured to enable searching a local data store for a stored biometric template. The local data store may be part of the home computing system. If the answer to 904 is yes and a matching local biometric template is found stored in the local data store, the method proceeds to 906.

At 906, the user is associated with a local user account associated with the matching local biometric template, and the method proceeds to 908. At 908, the method includes allowing the user access to a program on the computing device using the local user account, as described above.

If the answer to 904 is no, the method proceeds to 910. At 910, the method includes determining if the stored biometric template is stored remotely. For example, the stored biometric template may be stored on a remote server, which may be networked with a computing system. The computing system may be configured to enable searching a remote data store for a matching stored biometric template on the remote server. If the answer to 910 is no, the method proceeds to 912 and includes denying the user access to the program via a stored user account.

If the answer to 910 is yes, and a matching remote biometric template is found, then the method proceeds to 914. At 914, the method includes detecting a second user authentication mechanism. As such, the computing system may be configured to request a second form of user authentication based on a remote profile associated with the user. The second form of authentication may be customizable by the user. For example, a geographical location of the user may be selected as a second form of authentication. In such circumstances, the computing system may request consent from the user to release user data, such as user location, in order to satisfy the second form of authentication, such as determining the geographical location of a user. As another example, the second user authentication mechanism may include detecting a presence of a wireless signal characteristic of a mobile device known to be owned by the user. Likewise, the computing system may request consent from the user to release data associated with detecting the wireless signal of a mobile device associated with the user. Further, the user may be logged in under their user account on any device, and if the device is within a predetermined threshold range, may be used as another form of secondary user authentication. As another example, the user may be prompted to enter or speak a passphrase to further identify the user.

At 916, the method includes determining if the second user authentication mechanism has been satisfied. If the answer to 916 is yes, the method proceeds to 918. Using the above examples, if the gaming system detects the user in a known geographical location (or within a threshold distance), or detects a mobile device associated with the user, or receives a correct passphrase, then the second user authentication mechanism is satisfied.

At 918 the user is associated with a remote user account associated with the matching remote biometric template, and the method proceeds to 908. At 908, the method includes allowing access to the program on the computing device using the remote user account.

If the answer to 916 is no, the method proceeds to 912 and the user is denied access to the program through a stored user account. However it will be appreciated that in such circumstances the user may be added to a gaming session under a guest profile, for example. In some embodiments, the guest may optionally initiate a biometric identification registration at the completion of a gaming session. For example, the computing system may be configured to display an indication to the guest to optionally create a profile. Such an indication may occur at any time during the session. For example, the gaming session may be optionally paused to allow the guest to register a profile which may include biometric information. As another example, the gaming session may display an indication at the cessation of a gaming session to allow the guest to register a profile.

As illustrated in the example method 900, the computing system may be configured to first search the local device which may include biometric templates associated with one or more user profiles. When a local match is found the user is quickly associated with the system, else the system continues to search for a match remotely.

The computing device may be configured to search a remote server as a second option because the remote server may include biometric templates associated with significantly more users. However, method 900 may include additional or alternative steps that may increase the efficiency of searching the remote server by including various search constraints. For example, searching may be constrained geographically and/or socially. In this way, a user may establish a group of friends that they commonly interact with, and thus a group of computing devices that the user often accesses. As another non-limiting example, a user may speak a non-secret passphrase that drastically reduces the set of candidates from which the detected face descriptors may be matched to. Further, a user may be recognized by their voice-print in addition to their face descriptors.

Although above it is described that the local data store is searched first, it will be appreciated that the computing system may be configured to search either the local data store or the remote data store, for example based on user preferences or connectivity of the local device, or may search the both local and remote data stores concurrently.

As another option, the method may include searching a remote data store for the stored biometric template, and if a plurality of matching remote biometric templates are found, then filtering the plurality of matching remote biometric templates to one matching remote biometric template based on a determination that a second user authentication mechanism is satisfied, and then allowing access to the program using a remote user account associated with the matching remote biometric template, else, denying access to the program via a stored user account.

As described above, optionally including additional forms of authentication may impart different levels of security associated with a user account. The user may customize the security of their account according to the type of session that the account is associated with. In other words, the customizing options may be implemented regardless of whether the biometric template is stored locally or remotely.

Figure 10:
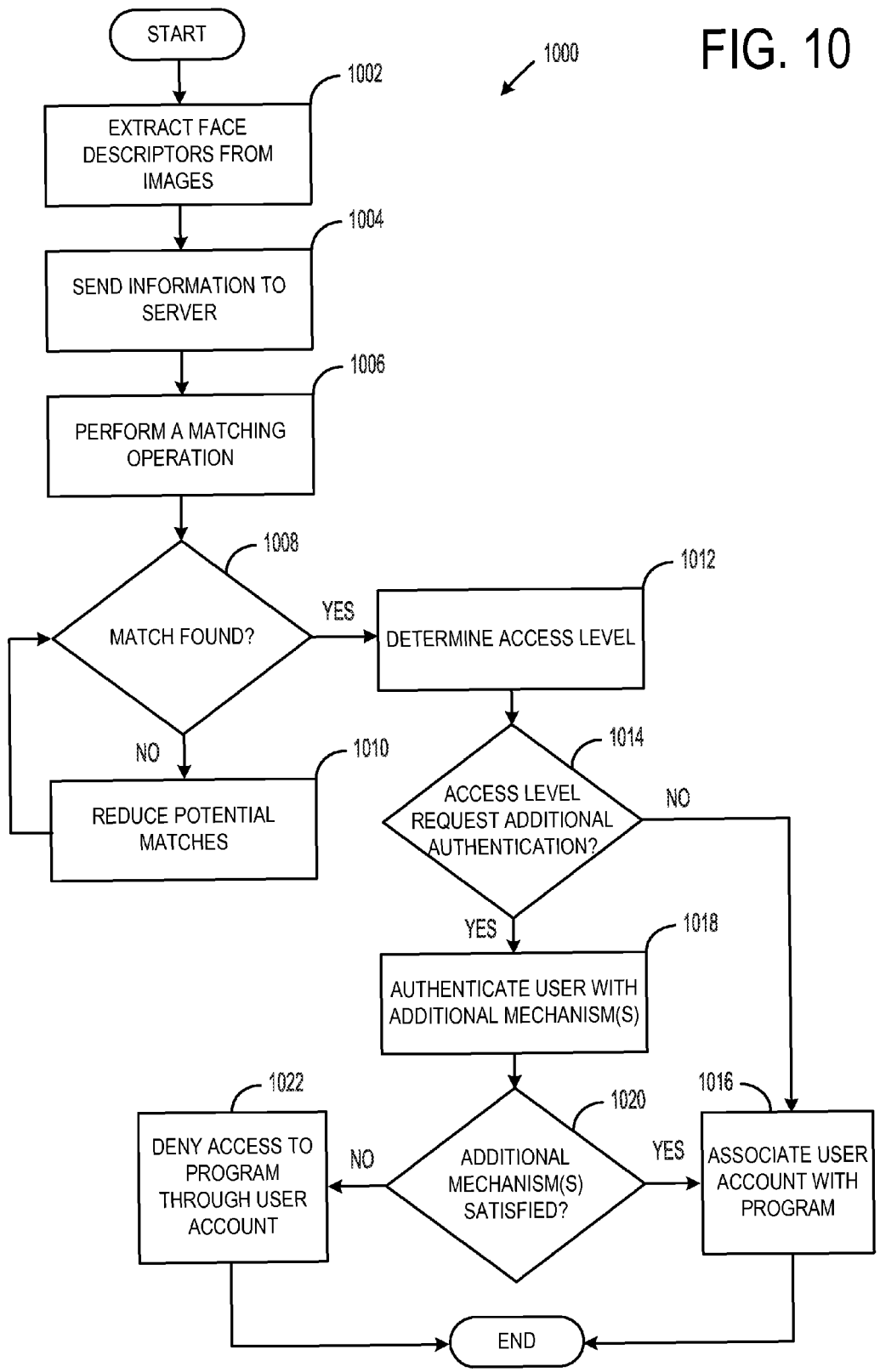
FIG. 10 is a flow chart that illustrates another example embodiment of a method for associating a user with a computing device.

For example, FIG. 10 illustrates an example method 1000 for associating a user with a computing device based upon an access level. For example, the access level may be a security level and may be customizable by the user according to the type of program, application, game, device etc. that the user desires to access with their user account. For example, a user may establish a low access level for a movie selection program, and may establish a high access level for a media purchasing program. It will be appreciated that any access level corresponding to any security level, may be established for virtually any program, application, game, device etc. In this way, a user may customize their account settings with account access preferences.

As illustrated in FIG. 10, method 1000 begins at 1002, the method comprising extracting face descriptors from one or more images of a user. As described above, face descriptors may be extracted after a user has been identified as a potential user.

At 1004, method 1000 includes sending information to a remote server. For example, information may include the extracted face descriptors, information pertaining to the type of program, application, game, etc. that the user is trying to access, and/or information pertaining to the type of device that the user is trying to associate with. The information sent to the remote server may be provided so as to determine what type of authentication protocol to follow in order to associate the user with the current session on the computing device, once the user is identified.

At 1006, method 1000 includes performing a matching operation. As described above, the matching operation may include matching the extracted face descriptors to a stored biometric template, wherein the biometric template may be stored locally and/or remotely. In the case of a biometric template being stored remotely, the stored biometric template may be one of a plurality of biometric templates stored on the remote server.

At 1008, method 1000 includes determining if the extracted face descriptors match a stored biometric template. If the answer to 1008 is no, the method proceeds to 1010.

At 1010, the method includes reducing the set of potential matches. For example, the number of potential matches may be reduced by performing one or more sorting mechanisms. As one example, a sorting mechanism may include reducing the number of potential matches by sorting the potential matches based on geographical, social, and/or other criteria that may help to further identify the user and associate the user with their user account. As another example, a sorting mechanism may include requesting input from the user to further authenticate the user. Input may include a second form of authentication such as the presence of a mobile device, a passphrase, voiceprint, etc., as described above. Such sorting mechanisms may reduce the number of potential matches in order to more efficiently associate a user with their user account.

It will be appreciated that the user may receive an indication to select their account from a reduced list of potential matches. For example, the user may receive, via the display device, a list of profile pictures associated with the reduced list of potential matches. The user may be asked to select the profile picture associated with their account. In such circumstances, the user may be prompted to enter a secret passphrase to verify the identity of the user before associating the user with the selected user account. It will be appreciated that a list of potential profile pictures is provided by way of example and that other indications are possible without departing from the scope of this disclosure.

Turning back to FIG. 10, if the answer to 1008 is yes, the method proceeds to 1012. For example, the method may proceed to 1012 if a match is determined on the first attempt. As another example, the match may be determined after one or more sorting mechanisms, as described above. Further, a match may be determined when the extracted face descriptors match a stored biometric template within a predetermined threshold matching score, as described above.

At 1012, method 1000 includes determining an access level associated with the user account. Using the examples provided above, if a user is attempting to associate their user account with a movie selection program, the user account preferences may determine that the access level is a low security level. As another example, if the user is attempting to associate their user account with a media purchasing program, the user account preferences may determine that the access level is a high security level.

As described above, the particular access level is customizable by the user. Therefore, once a user has been matched to their user account, the access level is determined by the user account settings. The user account settings may be defined during a registration phase and/or at any time when the user is logged into their account, for example. As another example, a program, application, game, and/or device may be associated with a default access level until the user defines their particular account settings. Further still, the user may receive an indication requesting their consent to use the default access level or establish account settings.

At 1014, method 1000 includes determining if the access level requests additional authentication to identify the user. If the answer to 1014 is no, method 1000 proceeds to 1016 and the user is associated with the program on the computing device via their user account. For example, if the user is attempting to associate their user account with a movie selection program, which may correspond to a low security access level, association with the program may not include authentication beyond matching the extracted face descriptors to the stored biometric template. If the answer to 1014 is yes, method 1000 proceeds to 1018.

At 1018, method 1000 includes authenticating the user with one or more additional mechanisms. For example, if the user is attempting to associate their user account with a media purchasing program, which may correspond to a high security access level, association with the program may include authentication in addition to matching the extracted face descriptors to the stored biometric template. As described above, additional forms of authentication may include input received from the user, such as a passphrase, voiceprint, wireless signal from a mobile device, etc. It will be appreciated, that depending on the access level, association with a particular program may include more than one additional authentication mechanism.

At 1020, method 1000 includes determining if the one or more additional authentication mechanisms have been satisfied. If the answer to 1020 is yes, the method proceeds to 1016 and the user is associated with the program on the computing device via their user account. If the answer to 1020 is no, the method proceeds to 1022 and the user is denied access to the program on the computing device via a user account. It will be appreciated however, that the user may still be associated with the program but without a user account. For example, the user may be associated with the program as a guest, as described above.

It will be appreciated that method 1000 is provided by way of example and may include additional or alternative steps than those provided in FIG. 10. Method 1000 is an example for associating a user with a current session on a computing device via a user account based upon an access level. As described above, the access level may be a security-type level and may be customizable by receiving input from the user that establishes user account settings.

The above described methods and processes enable a user to be identified by a computing device based on the user's detected face descriptors. By creating a biometric template of the user that compiles face descriptors analyzed from various locations and various orientations, a more robust biometric template associated with the user can be generated. In this way, the face of a user may be identified in virtually any suitable lighting condition from virtually any angle. Further, since the above methods include augmenting the stored biometric template of the user over time, the biometric template ages with the user. In other words, the biometric template changes as the user's appearance changes. Additionally, a user may access their account remotely so that they may enjoy, for example, a gaming experience at a friend's house. In this way, a user's face may be identified in varying environments. Under these circumstances, a user may enjoy a magical computing experience wherein their user profile is seamlessly integrated with a computing session automatically.

In some embodiments, the above described methods and processes may be tied to a computing system including one or more computers. In particular, the methods and processes described herein may be implemented as a computer application, computer service, computer API, computer library, and/or other computer program product.

Figure 11:
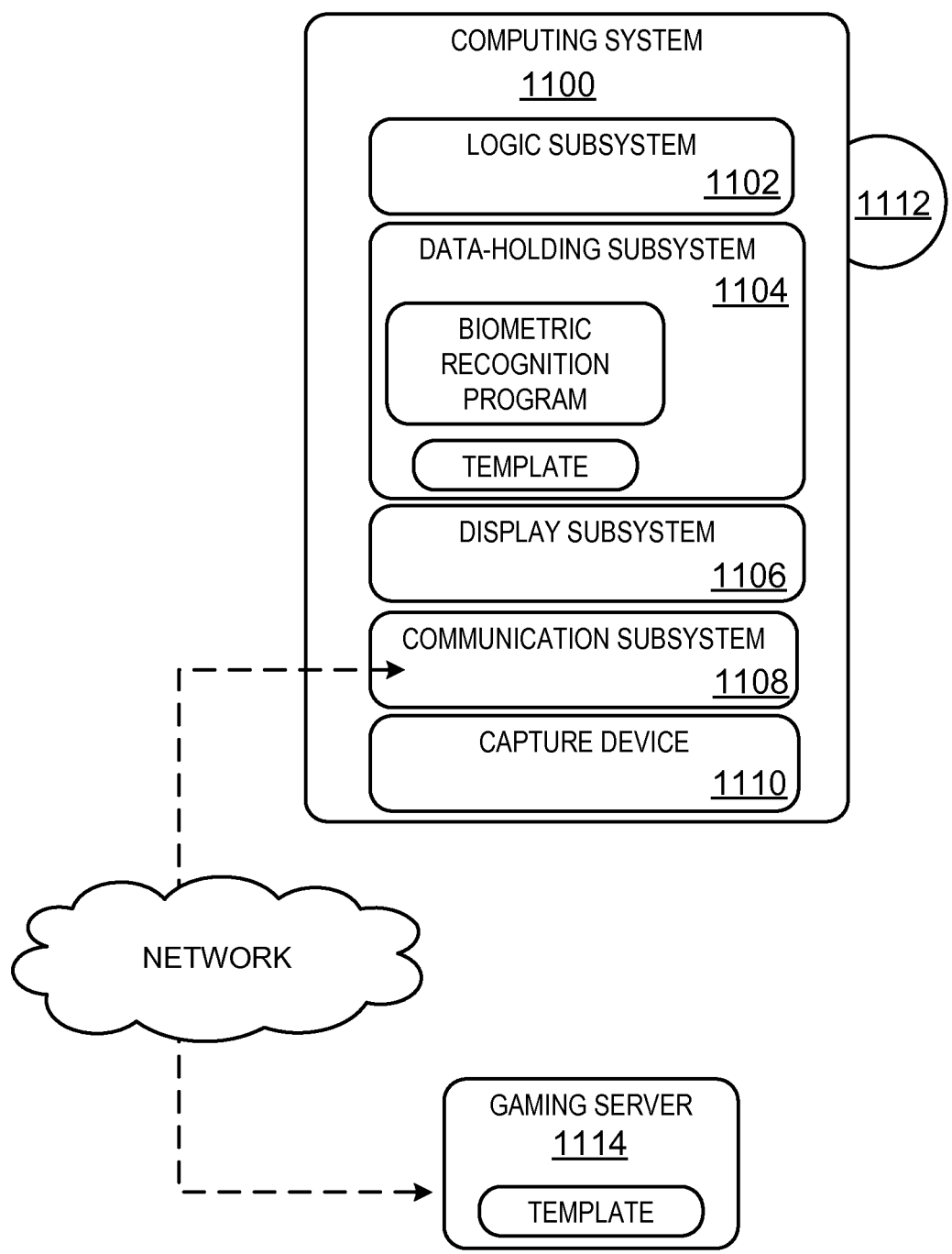
FIG. 11 is a schematic view of a computing system that may be used as the gaming system of FIG. 1.

FIG. 11 schematically shows a non-limiting computing system 1100 that may perform one or more of the above described methods and processes. Computing system 1100 is shown in simplified form. It is to be understood that virtually any computer architecture may be used without departing from the scope of this disclosure. In different embodiments, computing system 1100 may take the form of a mainframe computer, server computer, desktop computer, laptop computer, tablet computer, home entertainment computer, network computing device, mobile computing device, mobile communication device, gaming device, etc.

Computing system 1100 includes a logic subsystem 1102 and a data-holding subsystem 1104. Computing system 1100 may optionally include a display subsystem 1106, communication subsystem 1108, capture device 1110 and/or other components not shown in FIG. 11. Computing system 1100 may also optionally include user input devices such as keyboards, mice, game controllers, cameras, microphones, and/or touch screens, for example.

Logic subsystem 1102 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result. For example, logic subsystem 1102 may be configured to execute instructions that enable biometric identification, as described above.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 1104 may include one or more physical, non-transitory, devices configured to hold data and/or instructions executable by the logic subsystem to implement the herein described methods and processes. As shown, data-holding subsystem 1104 may include a biometric recognition program that holds instructions for registering a user for biometric recognition and/or identifying a user by matching the user to a biometric template, which may be stored in data-holding subsystem 1104, as shown and described above. A user biometric template may also be stored on gaming server 1114 connected to the computing system via a network, which will be discussed in greater detail below.

Data-holding subsystem 1104 may be transformed (e.g., to hold different data) when methods and processes are implemented. For example, one or more biometric templates representing one or more users may be augmented upon each user login, as described above. In this way, the state of data-holding subsystem 1104 may be transformed to update the user biometric template.

Data-holding subsystem 1104 may include removable media and/or built-in devices. Data-holding subsystem 1104 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 1104 may include devices with one or more of the following characteristics: volatile, nonvolatile, dynamic, static, read/write, read-only, random access, sequential access, location addressable, file addressable, and content addressable. In some embodiments, logic subsystem 1102 and data-holding subsystem 1104 may be integrated into one or more common devices, such as an application specific integrated circuit or a system on a chip.

FIG. 11 also shows an aspect of the data-holding subsystem in the form of removable computer-readable storage media 1112 which may be used to store and/or transfer data and/or instructions executable to implement the herein described biometric recognition methods. Removable computer-readable storage media 1112 may hold instructions for a particular video game, for example, and may take the form of CDs, DVDs, HD-DVDs, Blu-Ray Discs, EEPROMs, and/or floppy disks, among others.

It is to be appreciated that data-holding subsystem 1104 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 1100 that is implemented to perform one or more particular functions. In some cases, such a module, program, or engine may be instantiated via logic subsystem 1102 executing instructions held by data-holding subsystem 1104. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 1106 may be used to present a visual representation of data held by data-holding subsystem 1104. For example, display subsystem 1106 may present a virtual space to a game player, as described above. As the herein described methods and processes change the data held by the data-holding subsystem, and thus transform the state of the data-holding subsystem, the state of display subsystem 1106 may likewise be transformed to visually represent changes in the underlying data. Display subsystem 1106 may include one or more display devices utilizing virtually any type of technology. Such display devices may be combined with logic subsystem 1102 and/or data-holding subsystem 1104 in a shared enclosure, or such display devices may be peripheral display devices.

When included, communication subsystem 1108 may be configured to communicatively couple computing system 1100 with one or more other computing devices. For example, communication subsystem 1108 may enable a gaming device to connect with a remote gaming server 1114 to allow user access to a remote biometric template, as described above. Communication subsystem 1108 may include wired and/or wireless communication devices compatible with one or more different communication protocols. As non-limiting examples, the communication subsystem may be configured for communication via a wireless telephone network, a wireless local area network, a wired local area network, a wireless wide area network, a wired wide area network, etc. In some embodiments, the communication subsystem may allow computing system 1100 to send and/or receive messages to and/or from other devices via a network such as the Internet.

Computing system 1100 may include one or more capture devices 1110 configured to obtain information about the 3D interaction space. The one or more capture devices 1110 may be configured to obtain information optically and in real time. For example, the one or more capture devices 1110 may comprise a depth camera configured to obtain one or more depth images of the 3D interaction space, which will be discussed in greater detail with reference to FIG. 12. One or more capture devices 1110 may be placed at different positions within the 3D interaction space, and as such, may be wirelessly linked to computing system 1100. The one or more capture devices 1110 may be configured to obtain information regarding the position and/or orientation of a user's face. Further, the one or more capture devices 1110 may capture images of the user's face in a series of locations and/or in a series of poses. In this way, the one or more capture devices may detect variations in the user's face that may occur due to varying light conditions.

Additionally or alternatively, computing system 1100 may be operatively coupled to one or more infrared cameras, thermal imaging cameras, laser range finders, time of flight cameras, and/or structured light 3D scanners. Such technologies may be directly coupled and/or remotely linked to computing system 1100. For example, one or more infrared cameras may be operatively coupled to computing system 1100 to capture images of the face of a user in low light conditions within the 3D interaction space.

FIG. 12 shows a simplified processing pipeline in which game player 1210 in 3D interaction space 1200 is modeled as a virtual skeleton that can be used to draw a virtual avatar on display device 1216 and/or serve as a control input for controlling other aspects of a game, application, and/or operating system. It will be appreciated that a processing pipeline may include additional steps and/or alternative steps to those depicted in FIG. 12 without departing from the scope of this disclosure.

As shown in FIG. 12, game player 1210 and the rest of 3D interaction space 1200 may be imaged by a capture device such as depth camera 1218. The depth camera may determine, for each pixel, the depth of a surface in the observed scene relative to the depth camera. Virtually any depth finding technology may be used without departing from the scope of this disclosure.

The depth information determined for each pixel may be used to generate a depth map. Such a depth map may take the form of virtually any suitable data structure, including but not limited to a matrix that includes a depth value for each pixel of the observed scene. In FIG. 12, the depth map is schematically illustrated as a pixelated grid of the silhouette of game player 1210. This illustration is simplified for ease of understanding. It is to be understood that a depth map generally includes depth information for all pixels, not just pixels that image the game player 1210, and that the perspective of depth camera 1218 would not result in the silhouette depicted in FIG. 12.

A virtual skeleton may be derived from the depth map to provide a machine readable representation of game player 1210. In other words, the virtual skeleton is derived from the depth map to model game player 1210. The virtual skeleton may be derived from the depth map in any suitable manner. In some embodiments, one or more skeletal fitting algorithms may be applied to the depth map. The present disclosure is compatible with virtually any skeletal modeling techniques.

The virtual skeleton may include a plurality of joints, each joint corresponding to a portion of the game player. In FIG. 12, the virtual skeleton is illustrated as a fifteen-joint stick figure. This illustration is simplified for ease of understanding. Virtual skeletons in accordance with the present disclosure may include virtually any number of joints, each of which can be associated with virtually any number of parameters (e.g., three dimensional joint position, joint rotation, body posture of corresponding body part (e.g., hand open, hand closed, etc.) etc.). It is to be understood that a virtual skeleton may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc.).

As shown in FIG. 12, a virtual avatar may be rendered on display device 1216 as a visual representation of the virtual skeleton. Because the virtual skeleton models game player 1210, and the rendering of the virtual avatar is based on the virtual skeleton, the virtual avatar serves as a viewable digital representation of the game player 1210. As such, movement of the virtual avatar on display device 1216 reflects the movements of game player 1210.

In some embodiments, only portions of a virtual avatar will be presented on display device 1216. As one non-limiting example, display device 1216 may present a first person perspective to game player 1210 and may therefore present the portions of the virtual avatar that could be viewed through the virtual eyes of the virtual avatar (e.g., outstretched hands holding a steering wheel, outstretched arms holding a rifle, outstretched hands grabbing a virtual object in a three-dimensional virtual world, etc.).

While the virtual avatar is used as an example aspect of a game that may be controlled by the movements of a game player via the skeletal modeling of a depth map, this is not intended to be limiting. A game player may be modeled with a virtual skeleton, and the virtual skeleton can be used to control aspects of a game or other application other than a virtual avatar. For example, the movement of a game player can control a game or other application even if a virtual avatar is not rendered to the display device.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for biometric identification for use with a computing device, the method comprising:
capturing via a camera a temporal sequence of images of a face of a user at each of a series of physical locations within a three-dimensional interaction space monitored by the camera associated with the computing device;
extracting one or more face descriptors from the temporal sequence of images;
generating a biometric template compiling the one or more face descriptors;
storing the biometric template of the user in a data store for biometric identification of the user;
instructing the user to perform a requested pose at one of the physical locations by displaying a pose movement icon;
determining that the user has not matched the requested pose to within a matching threshold; and
presenting pose feedback to the user requesting that the user adjust the pose in a determined manner.

2. The method of claim 1, further comprising instructing the user to move to the series of locations within the three-dimensional interaction space.

3. The method of claim 2, wherein instructing the user to move to the series of location includes:
displaying a three-dimensional map within the virtual space, the three-dimensional map including a series of virtual locations that correspond to the series of physical locations in the three-dimensional interaction space; and
displaying a visual cue at a target virtual location within the three-dimensional map, to prompt the user to move to a target physical location within the three-dimensional interaction space corresponding to the target virtual location.

4. The method of claim 2, wherein instructing the user to move to the series of locations includes displaying a user character figure in the virtual space animated to match a position of the user within the three-dimensional interaction space as the user moves.

5. The method of claim 4, further comprising:
detecting movement of the user to the target physical location in the three-dimensional interaction space by analyzing the temporal sequence of images; and
displaying the user character figure at the target virtual location based on the detected movement.

6. The method of claim 5, wherein detecting movement comprises:
generating a skeletal model of the user based on the temporal sequence of images; and
adjusting a configuration and position of the skeletal model to match the detected movement of the user.

7. The method of claim 6, wherein a location of the face of the user in each of the temporal sequence of images is determined by making reference to the skeletal model.

8. The method of claim 1, wherein instructing the user to perform the requested pose further includes displaying the pose movement icon proximate to the user character figure and/or displaying a pose instructor figure performing a requested pose.

9. The method of claim 1, further comprising:
wherein the temporal sequence of images of the face of the user for a location of the series of physical locations is captured while the user is performing the pose.

10. The method of claim 1, further comprising:
during an identification phase, identifying the user by matching the extracted face descriptors of the user to a stored biometric template associated with a user account, wherein a match is determined within a threshold matching score; and
associating the user account with the user in a current session on the computing device.

11. The method of claim 10, further comprising:
on each login of the user, augmenting the biometric template of the user with updated face descriptors, to account for changes in the user's face over time.

12. The method of claim 11, further comprising:
filtering the biometric template to remove outlying face descriptors thereby generating a consolidated representation of the user over time.

13. The method of claim 10, further comprising:
controlling access to features of the computing device based upon whether a matched biometric template is for a user account stored on a local computing device or for a user account stored on a remote server, by requesting a second form of user authentication based on a remote profile, wherein the second form of user authentication is customizable by receiving input from the user.

14. The method of claim 10, wherein the computing device is a gaming device, and the identification phase is during game play.

15. A method for associating a user with a computing device, the method comprising:
identifying face descriptors of a user from images captured of the user's face;
performing a matching operation to match the face descriptors of the user to a stored biometric template;
searching a local data store for the stored biometric template, finding a matching local biometric template stored in the local data store of the computing device, and based on finding the matching local biometric template allowing access to a program using a local user account associated with the matching local biometric template;
identifying face descriptors of another user from images captured of the other user's face;
performing a matching operation to match the face descriptors of the other user to another stored biometric template;
searching the local data store for the other stored biometric template and not finding the other stored biometric template; and
based on not finding the other stored biometric template in the local data store, searching a remote data store for the other stored biometric template, finding a matching remote biometric template in the remote data store, determining whether a second user authentication mechanism is satisfied, and if so, then allowing access to the program using a remote user account associated with the matching remote biometric template, else, denying access to the program via a stored user account.

16. The method of claim 15, wherein searching the remote data store for the other stored biometric template further comprises, if a plurality of matching remote biometric templates are found, then filtering the plurality of matching remote biometric templates to one matching remote biometric template based on a determination that the second user authentication mechanism is satisfied, and then allowing access to the program using the remote user account associated with the matching remote biometric template, else, denying access to the program via the stored user account.

17. The method of claim 15, wherein the second user authentication mechanism is detecting a geographical location of the other user and determining that the detected geographical location matches a known location for the other user.

18. The method of claim 15, wherein the second user authentication mechanism is detecting a presence of a wireless signal characteristic of a mobile device known to be associated with the other user, the association based upon receiving input from the other user that identifies the mobile device with the other user.

19. The method of claim 15, wherein the stored biometric template associated with the user is updated with each user login by augmenting the stored biometric template of the user with updated face descriptors, to account for changes in the user's face over time.

20. A method for associating a user with a computing device, the method comprising:
- identifying face descriptors of a user from images captured of the user's face;
- performing a matching operation to match the face descriptors of the user to a stored biometric template;
- searching a local data store for the stored biometric template, finding a matching local biometric template stored in the local data store of the computing device, and based on finding the matching local biometric template allowing access to a program using a local user account associated with the matching local biometric template;
- identifying face descriptors of another user from images captured of the other user's face;
- performing a matching operation to match the face descriptors of the other user to another stored biometric template;
- searching the local data store for the other stored biometric template and not finding the other stored biometric template;
- based on not finding the other stored biometric template in the local data store, searching a remote data store for the other stored biometric template, finding a matching remote biometric template in the remote data store, determining whether a second user authentication mechanism is satisfied, and if so, then allowing access to the program using a remote user account associated with the matching remote biometric template, else, denying access to the program via a stored user account, or
- based on not finding the other stored biometric template in the local data store, searching the remote data store for the other stored biometric template, finding a plurality of matching remote biometric templates in the remote data store, filtering the plurality of matching remote biometric templates to one matching remote biometric template based on a determination that the second user authentication mechanism is satisfied, and then allowing access to the program using the remote user account associated with the matching remote biometric template, else, denying access to the program via the stored user account.

* * * * *